(12) United States Patent
Cheung et al.

(10) Patent No.: US 10,546,002 B2
(45) Date of Patent: *Jan. 28, 2020

(54) MULTIPLE SUB-STRING SEARCHING (71) Applicant: International Business Machines Corporation, Armonk, NY (US)

(72) Inventors: Chi-Wai Cheung, Richmond Hill (CA); Ying-Chau R. Mak, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 435 days.

This patent is subject to a terminal disclaimer.

(21) Appl. No.: 14/842,866

(22) Filed: Sep. 2, 2015

(65) Prior Publication Data

US 2017/0011120 A1 Jan. 12, 2017

Related U.S. Application Data (63) Continuation of application No. 14/791,850, filed on Jul. 6, 2015.

(51) Int. Cl.
G06F 16/33 (2019.01)
G06F 16/31 (2019.01)

(52) U.S. Cl.
CPC .......... *G06F 16/334* (2019.01); *G06F 16/325* (2019.01)

(58) Field of Classification Search
CPC .................. G06F 17/30675; G06F 17/30386
See application file for complete search history.

(56) References Cited

U.S. PATENT DOCUMENTS

| | | | |
|---|---|---|---|
| 8,095,530 B1 * | 1/2012 | Lloyd | G06F 7/02 707/709 |
| 8,166,021 B1 | 4/2012 | Cao et al. | |
| 8,341,415 B1 * | 12/2012 | Raphel | H04L 9/3239 713/180 |
| 9,256,644 B1 * | 2/2016 | Spellward | G06F 16/334 |
| 9,721,017 B2 * | 8/2017 | Denninghoff | H03H 9/02622 |
| 9,836,383 B1 | 12/2017 | Baars | |
| 2003/0120647 A1 * | 6/2003 | Aiken | G06F 16/951 |
| 2006/0129555 A1 * | 6/2006 | Burdick | G06Q 30/02 |

(Continued)

OTHER PUBLICATIONS

Appendix P, List of IBM Patents or Patent Applications Treated as Related, pp. 1-2, filed Sep. 2, 2015.

(Continued)

*Primary Examiner* — Usmaan Saeed
*Assistant Examiner* — David M Nafziger
(74) *Attorney, Agent, or Firm* — Edward J. Wixted, III (57) ABSTRACT

A method for searching for multiple sub-strings of an original text is provided. A search query is received, wherein the search query includes a plurality of sub-strings. A hash array is allocated. The hash array has a size based, at least in part, on the plurality of sub-strings and an original text. The hash array is populated with a plurality of hash values, wherein the plurality of hash values are generated using a rolling hash function, and wherein each of the plurality of hash values corresponds to a portion of the original text. A plurality of sub-string values are computed based on the plurality of sub-strings. Each of the plurality of sub-strings are determined to occur in the original text based, at least in part, on searching the hash array for the plurality of sub-string values.

7 Claims, 3 Drawing Sheets

(56) References Cited

U.S. PATENT DOCUMENTS

| | | | |
|---|---|---|---|
| 2006/0253439 A1* | 11/2006 | Ren | G06F 16/313 |
| 2007/0043750 A1* | 2/2007 | Dingle | G06F 16/90335 |
| 2007/0115986 A1* | 5/2007 | Shankara | H04L 63/145 |
| | | | 370/392 |
| 2007/0250670 A1* | 10/2007 | Fineberg | G06F 3/0608 |
| | | | 711/154 |
| 2008/0010278 A1* | 1/2008 | Kencl | G06F 21/564 |
| 2008/0034417 A1* | 2/2008 | He | H04L 67/02 |
| | | | 726/15 |
| 2010/0125594 A1* | 5/2010 | Li | G06F 16/90344 |
| | | | 707/758 |
| 2010/0287173 A1* | 11/2010 | Schneider | G06F 16/325 |
| | | | 707/759 |
| 2011/0066631 A1* | 3/2011 | Choi | G06F 7/02 |
| | | | 707/769 |
| 2011/0078152 A1* | 3/2011 | Forman | G06F 17/277 |
| | | | 707/747 |
| 2011/0145260 A1 | 6/2011 | Ichino | |
| 2012/0023073 A1* | 1/2012 | Dean | G06F 16/355 |
| | | | 707/693 |
| 2012/0323978 A1* | 12/2012 | Van Rooyen | G06Q 40/04 |
| | | | 707/812 |
| 2013/0226941 A1 | 8/2013 | Kosuru | |
| 2013/0238570 A1* | 9/2013 | Rao | G06F 3/0608 |
| | | | 707/692 |
| 2014/0082006 A1* | 3/2014 | Knight | G06F 16/325 |
| | | | 707/758 |
| 2014/0164352 A1* | 6/2014 | Denninghoff | H03H 9/02622 |
| | | | 707/711 |
| 2014/0181122 A1* | 6/2014 | Jain | G06F 16/328 |
| | | | 707/749 |
| 2015/0227594 A1* | 8/2015 | Herz | G06F 16/9535 |
| | | | 707/725 |
| 2015/0347590 A1* | 12/2015 | Kamotsky | G06F 16/9535 |
| | | | 707/723 |
| 2016/0188589 A1 | 6/2016 | Guilford | |
| 2016/0275180 A1* | 9/2016 | Matskevich | G06F 16/3344 |
| 2017/0011115 A1* | 1/2017 | Cheung | G06F 16/334 |
| 2017/0228409 A1* | 8/2017 | Darcy | G06F 16/13 |
| 2017/0300691 A1* | 10/2017 | Upchurch | G06F 21/563 |

OTHER PUBLICATIONS

Sedgewick et al., "Algorithms, Fourth Addition", 5.3 Substring Search, last modified on Oct. 26, 2014, Copyright © 2002-2014 Robert Sedgewick and Kevin Wayne, pp. 1-6.

Cheung et al., "Multiple Sub-String Searching", U.S. Appl. No. 14/791,850, filed Jul. 6, 2015, pp. 1-27.

* cited by examiner

MULTIPLE SUB-STRING SEARCHING

BACKGROUND OF THE INVENTION

The present invention relates generally to the field of sub-string searching, and more particularly to searching multiple sub-strings in a text editor.

A text editor is a type of computer program used for editing plain text files. A plain text file uses 8-bit characters to represent numbers, letters, and symbols. Often, documents using markup languages are stored in plain text files. Many text editors support features for searching for a sub-string within the text file. For example, to find or replace a sub-string within the file.

SUMMARY

According to one embodiment of the present disclosure, a method for searching multiple sub-strings is provided. The method includes receiving, by one or more processors, a search query, wherein the search query comprises a plurality of sub-strings; allocating, by one or more processors, a hash array having a size based, at least in part, on the plurality of sub-strings and an original text; populating, by one or more processors, the hash array with a plurality of hash values, wherein the plurality of hash values are generated using a rolling hash function, and wherein each of the plurality of hash values corresponds to a portion of the original text; computing, by one or more processors, a plurality of sub-string values based, at least in part, on the plurality of sub-strings; and determining, by one or more processors, whether each of the plurality of sub-strings occur in the original text based, at least in part, on searching the hash array for the plurality of sub-string values.

According to another embodiment of the present disclosure, a computer program product for searching multiple sub-strings is provided. The computer program product comprises a computer readable storage medium and program instructions stored on the computer readable storage medium. The program instructions include program instructions to receive a search query, wherein the search query comprises a plurality of sub-strings; program instructions to allocate a hash array having a size based, at least in part, on the plurality of sub-strings and an original text; program instructions to populate the hash array with a plurality of hash values, wherein the plurality of hash values are generated using a rolling hash function, and wherein each of the plurality of hash values corresponds to a portion of the original text; program instructions to compute a plurality of sub-string values based, at least in part, on the plurality of sub-strings; and program instructions to determine whether each of the plurality of sub-strings occur in the original text based, at least in part, on searching the hash array for the plurality of sub-string values.

According to another embodiment of the present disclosure, a computer system for searching multiple sub-strings is provided. The computer system includes one or more computer processors, one or more computer readable storage media, and program instructions stored on the computer readable storage media for execution by at least one of the one or more processors. The program instructions include program instructions to receive a search query, wherein the search query comprises a plurality of sub-strings; program instructions to allocate a hash array having a size based, at least in part, on the plurality of sub-strings and an original text; program instructions to populate the hash array with a plurality of hash values, wherein the plurality of hash values are generated using a rolling hash function, and wherein each of the plurality of hash values corresponds to a portion of the original text; program instructions to compute a plurality of sub-string values based, at least in part, on the plurality of sub-strings; and program instructions to determine whether each of the plurality of sub-strings occur in the original text based, at least in part, on searching the hash array for the plurality of sub-string values.

DETAILED DESCRIPTION

An embodiment of the present invention recognizes that sub-string searching within a text file is limited to a single sub-string. For example, the find or locate function within a text editor. However, text editors cannot search multiple sub-strings simultaneously, especially where the sub-strings are of different lengths. Where a search of multiple sub-strings is needed, each sub-string is searched individually (e.g., consecutively). Individually searching each sub-string can exhaust time and resources. A character-by-character comparison method can be used to search a text document for one or more sub-strings. However, this is a resource intensive process as the number of possible sub-string combinations in a text document are substantial.

An embodiment of the present invention provides a way to efficiently search multiple sub-strings in a text file. An algorithm of the present invention interleaves hash sequences for multi-length sub-string searches to create a single hashing array. The algorithm is used to search a text string for multiple sub-strings simultaneously.

Figure 1:
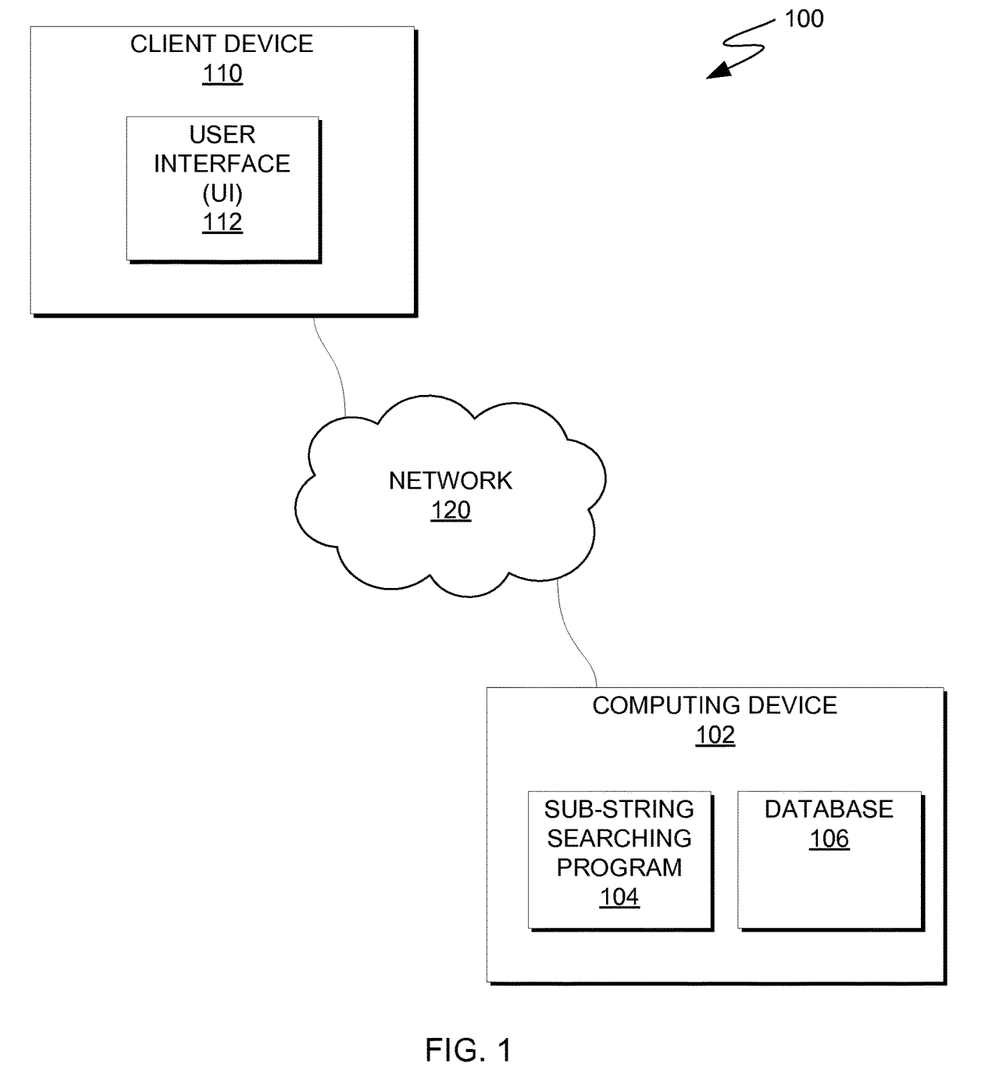
FIG. 1 is a functional block diagram illustrating a computing environment, in accordance with an embodiment of the present invention.

The present invention will now be described in detail with reference to the Figures. FIG. 1 is a functional block diagram illustrating a computing environment, in accordance with an embodiment of the present invention. For example, FIG. 1 is a functional block diagram illustrating computing environment 100. Computing environment 100 includes computing device 102 and client device 110 connected over network 120. Computing device 102 includes sub-string searching program 104.

In various embodiments, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to client device 110, and with access to and/or capable of executing sub-string searching program 104. Computing device 102 may include internal and external hardware components, as depicted and described in further detail with respect to FIG. 3.

In some embodiments, sub-string searching program 104 and database 106 are stored on computing device 102. In other embodiments, one or both of sub-string searching program 104 and database 106 may reside on another computing device, provided that each can access and is accessible by each other of sub-string searching program 104 and database 106. In yet other embodiments, one or both of sub-string searching program 104 and database 106 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 102 and client device 110, in accordance with a desired embodiment of the present invention.

Sub-string searching program 104 operates to search text for multiple sub-strings. In one embodiment, sub-string searching program 104 receives a text file and a search query (e.g., two or more sub-strings) related to the text file. Using a rolling hash function, hash sequences are generated for each sub-string search length. For example, sub-string searches can contain multiple sub-strings of the same length (e.g., two five-character sub-strings and a seven-character sub-string). In this example, one hash sequence will be created by hashing the original text into five characters and one sequence will be created hashing the original text into seven characters. The sub-strings are hashed using the same rolling hash function. A hash array is formed by interleaving each of the hash sequences. The sub-string hashes are compared to the hash array to determine a match. In some embodiments, a Translate and Test (TRT) array is used to compare the hash array and sub-string hashes. In other embodiments, vector instructions are used to compare the hash array and sub-string hashes. In other embodiments, sub-string searching program 104 individually compares the sub-string hashes to each entry of the hash array. The use of a single hash array can decrease processing time and increase overall performance of the search function.

Database 106 is a data repository that may be written to and read by sub-string searching program 104. Hash values, hash arrays, and TRT arrays may be stored to database 106. In some embodiments, one or more text files are stored to database 106. In some embodiments, database 106 may be written to and read by programs and entities outside of computing environment 100 in order to populate the repository with text files, search queries, encoding tables, etc. As used herein, "text file" refers to a portion of text. In various examples, a text file includes structured text data, unstructured text data, text data organized as a computer file, a portion of text contained in another computer file, or any other text data.

In various embodiments of the present disclosure, client device 110 can be a laptop computer, a tablet computer, a netbook computer, a personal computer (PC), a desktop computer, a personal digital assistant (PDA), a smart phone, or any programmable electronic device capable of communicating with computing device 102 via network 120. Client device 110 includes user interface (UI) 112. In some embodiments, a text file is stored to a storage device on client device 110.

Client device 110 includes a user interface (UI) UI 112, which executes locally on client device 110 and operates to provide a UI to a user of client device 110. UI 112 further operates to receive user input from a user via the provided user interface, thereby enabling the user to interact with client device 110. In one embodiment, UI 112 provides a user interface that enables a user of client device 110 to interact with sub-string searching program 104 of computing device 102 via network 120. In various examples, the user interacts with sub-string searching program 104 in order to send a search query to sub-string program 104. In one embodiment, UI 112 is stored on client device 110. In other embodiments, UI 112 is stored on another computing device (e.g., computing device 102), provided that UI 112 can access and is accessible by at least sub-string searching program 104.

Figure 2:
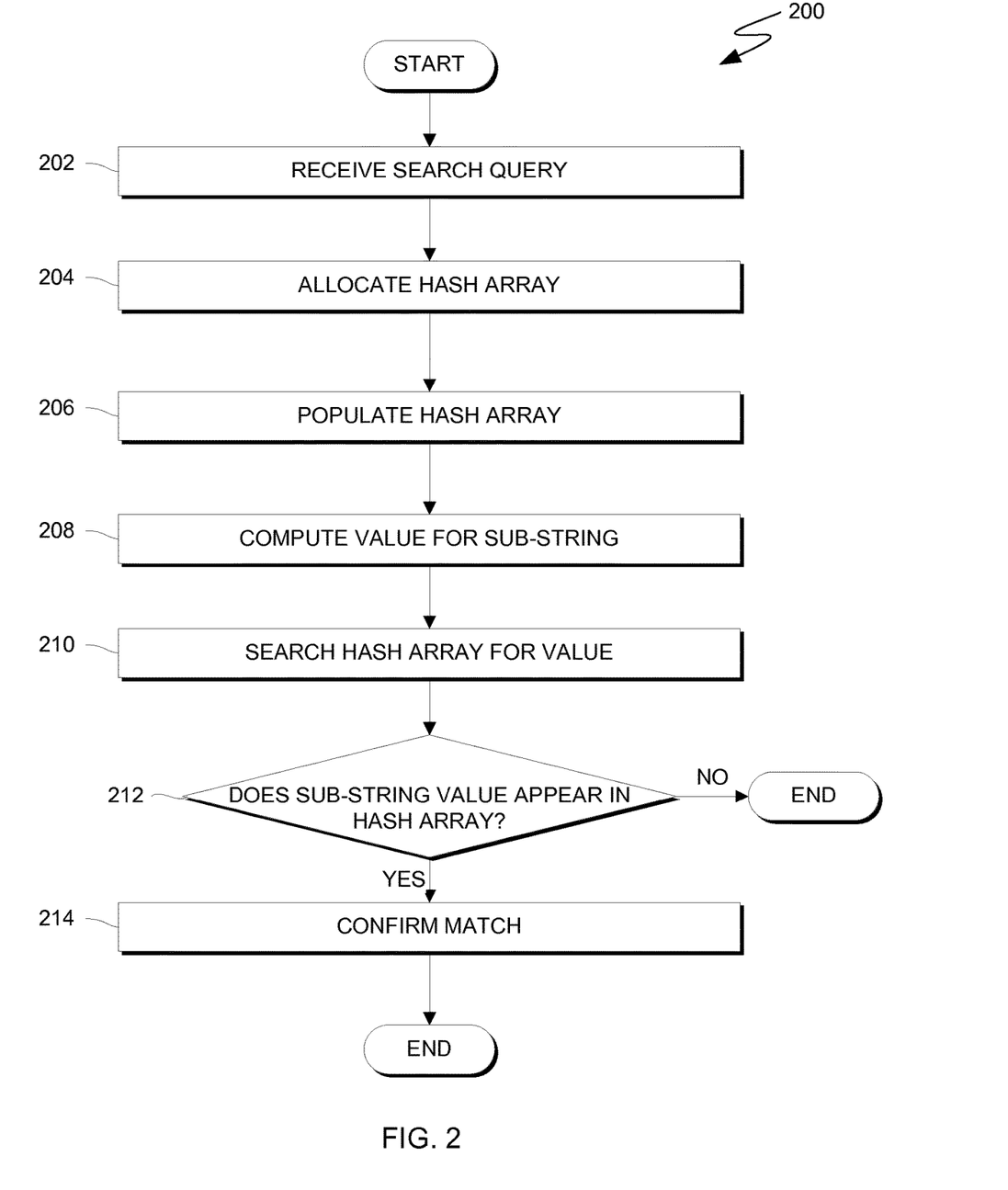
FIG. 2 is a flowchart depicting operations for multiple sub-string searching, on a computing device within the computing environment of FIG. 1, in accordance with an embodiment of the present invention.

FIG. 2 is a flowchart depicting operations for multiple sub-string searching, on a computing device within the computing environment of FIG. 1, in accordance with an embodiment of the present disclosure. For example, FIG. 2 is a flowchart depicting operations 200 of sub-string searching program 104, on computing device 102 within computing environment 100.

In step 202, sub-string searching program 104 receives a search query. Sub-string searching program 104 receives a search query for a text file. In some embodiments, the text file is stored to the database. In other embodiments, the text file is located on the client device and is provided to sub-string searching program 104 via the user interface. The search query includes two or more sub-strings. In some embodiments, the sub-strings are the same length (e.g., each sub-string is four characters long). In other embodiments, the sub-strings have different lengths. For example, a first sub-string has a length of four characters and a second substring has a length of seven characters. For convenience of description, m represents the lengths of the original text string and i represents the number of sub-strings of the query that have unique lengths. For example, i equals two where the query includes three sub-strings of length seven and one sub-string of length five.

In step 204, sub-string searching program 104 allocates a hash array. The hash array has a size (i.e. a maximum number of entries) equal to m*i. In one embodiments, each hash array element consists of one-byte. In other embodiments, each array element stores values of other widths, based on the hash function used. In embodiments where some or all of the sub-string searches are the same length, the hash array will have fewer entries, as the original text is hashed for each sub-string length. Therefore, where multiple sub-strings are the same length, the original text is hashed only once. For example, a search query contains three sub-strings (e.g., two four-character length sub-strings and a seven-character length sub-string), in which case sub-string searching program 104 will hash the original text once for the four-character length sub-strings and once for the seven-character length sub-strings. In this example, sub-string searching program 104 allocates a hash array with m*2 entries.

In step 206, sub-string searching program 104 populates the hash array. The original text string is transformed into hash values using a rolling hash, for each of sub-string lengths. Where the search query is for two sub-strings (e.g., one three characters in length and one six characters in length) sub-string searching program 104 creates two sequences of hash values. In one embodiment, the rolling hash can generate one-byte hash values. In other embodiments, the rolling hash generates hash values of other widths.

For example, the original text string of a text file is "1234567890xyzabcdefg." The search query is for a sub-string three characters in length (e.g., "xyz") and a sub-string six characters in length (e.g., "abcdef"). Sub-string searching program 104 creates hash values for each of the sub-string lengths, using a rolling hash. For example, a hash value for "123," "234," "345," etc. is created for the three length sub-string; the hash values are computed as $X_0$, $X_1$, $X_2$, etc. For example, for the three length sub-string hash values, the sequence is $X_0$=123, $X_1$=234, $X_2$=345, etc. Further, a hash value for "123456," "234567," "345678," etc. is created the six length sub-string; the six length sub-string hash values are computed as $Y_0$, $Y_1$, $Y_2$, etc. For example, for the six length sub-string hash values, the sequence is $Y_0$=123456, $Y_1$=234567, $Y_2$=345678, etc.

In some embodiments, the hash array is populated by creating an interleaving sequence. Using the example above, the hash array takes the form of "$X_0Y_0X_1Y_1 \ldots$". In some examples, where there are multiple sub-string lengths, the number of hash values in each sub-string hashing sequence will be different. In these examples, the last hash value of the shorter sequence or sequences is repeated to create equal length sequences. For example, using the values above, sub-string sequence X has 18 hash values and sub-string sequence Y has 14 hash values. In this case, the end of the hash array will take the form of "$X_{14}Y_{14}X_{15}Y_{14}X_{16}Y_{14}X_{17}Y_{14}$." Thus, the Y sequence is shorter, so the last value of the Y sequence is repeated. In other examples, the shorter sequence is padded with a value other than the last value of the shorter sequence. In some embodiments, the hash array is populated in the order of sub-string length. For example, the interleaving starts with the shortest sub-string length and ends with the longest sub-string length.

The use of the rolling hash can increase performance in searching multiple sub-strings. For example, where there is one sub-string and n is the sub-string length and m is the original text string length, the performance can be reduced from $O(n*(m-n+1))$ to $O(m-n+1)$. In this example, the performance increase is based on the performance of a rolling hash as compared to a character-by-character comparison. In some embodiments, CPU time can be more than halved by using the operations described herein, including a rolling hash, over a character-by-character comparison.

In step 208, sub-string searching program 104 computes values for the sub-strings. The same hash function used in step 206 is used. A hash value is created for each sub-string.

In step 210, sub-string searching program 104 searches hash array for sub-string value. The hash values in the hash array are compared to sub-string hash values. Where a match is found, the location in the original text string is indicated by the formula p/i, where p is the array element position in the hash array and i is the number of sub-strings.

In some embodiments, TRT instruction is used to search the hash array. For example, on computing devices with z/Architecture, TRT instruction is used. The hash values used are one-byte hash values. TRT instruction can search multiple byte values simultaneously. Where TRT instruction is used, sub-string searching program 104 initializes a TRT array based on the one-byte hash values computed in step 206. The TRT array is a 256-byte array. Each byte is an action code. Each action code correlates to one or more hash value calculated in step 206. A flag is placed in the TRT array at the action code that corresponds to each of the sub-string values. The TRT array searches the hash array for a match (e.g., a flagged action code appears in the hash array). In some embodiments, the TRT array is based on EBCDIC encoding.

In some embodiments, vector instructions are used to search the hash array. For example, on a computing device with vector or single instruction, multiple data (SIMD) instructions, vector instructions can be used. In some embodiments, hash values used in the vector instructions are wider than one-byte, based on hash function. The of step 206 facilitates the use of vector instructions, as the comparison of sub-string hash values can be done simultaneously for all sub-strings against element position p of the hash array. The hash values of each sub-string is stored in a vector, and the vector is compared with element position p of the hash array. Element position p, p+1, . . . , p+i−1 of the hash array are compared simultaneously. After position p is compared to the sub-strings, the hash array position is advanced by I and the comparison loop is repeated until the end of the hash array. The loop starts with p set to one, the first element position of the hash array.

In decision 212, sub-string searching program 104 determines whether the sub-string value appears in the hash array. If sub-string searching program 104 determines that the sub-string value appears in the hash array (decision 212, YES branch), sub-string search program 104 confirms a match between the original text and the sub-string (step 214). In some examples, a match between the hash array and sub-string value is a false positive. The search array (e.g., TRT array) is limited to a 256-byte array. Where more than 256 hash values exist (e.g., m is greater than 256), multiple hash values can correspond to a search array index number. For example, where m is greater than 256, original text values "abc" and "123" can both be equal to hash value 010101. However, where the sub-string value is "123," a false positive can occur where the original text contains the value "abc."

If sub-string searching program 104 determines that the sub-string value does not appear in the hash array (decision 212, NO branch), then sub-string searching program 104 terminates (END). Where there is not a match between the sub-string value and the hash array, sub-string searching program 104 indicates that there is no match. The hash array search does not return false negatives. Therefore, where no match is found, the original text does not contain the sub-string.

In step 214, sub-string searching program 104 confirms a match between the original text and the sub-string. In some embodiments, a character-by-character comparison is done between the flagged original text and the sub-string to confirm a match. The character-by-character comparison allows sub-string searching program 104 to determine whether a match is a true or a false positive.

Figure 3:
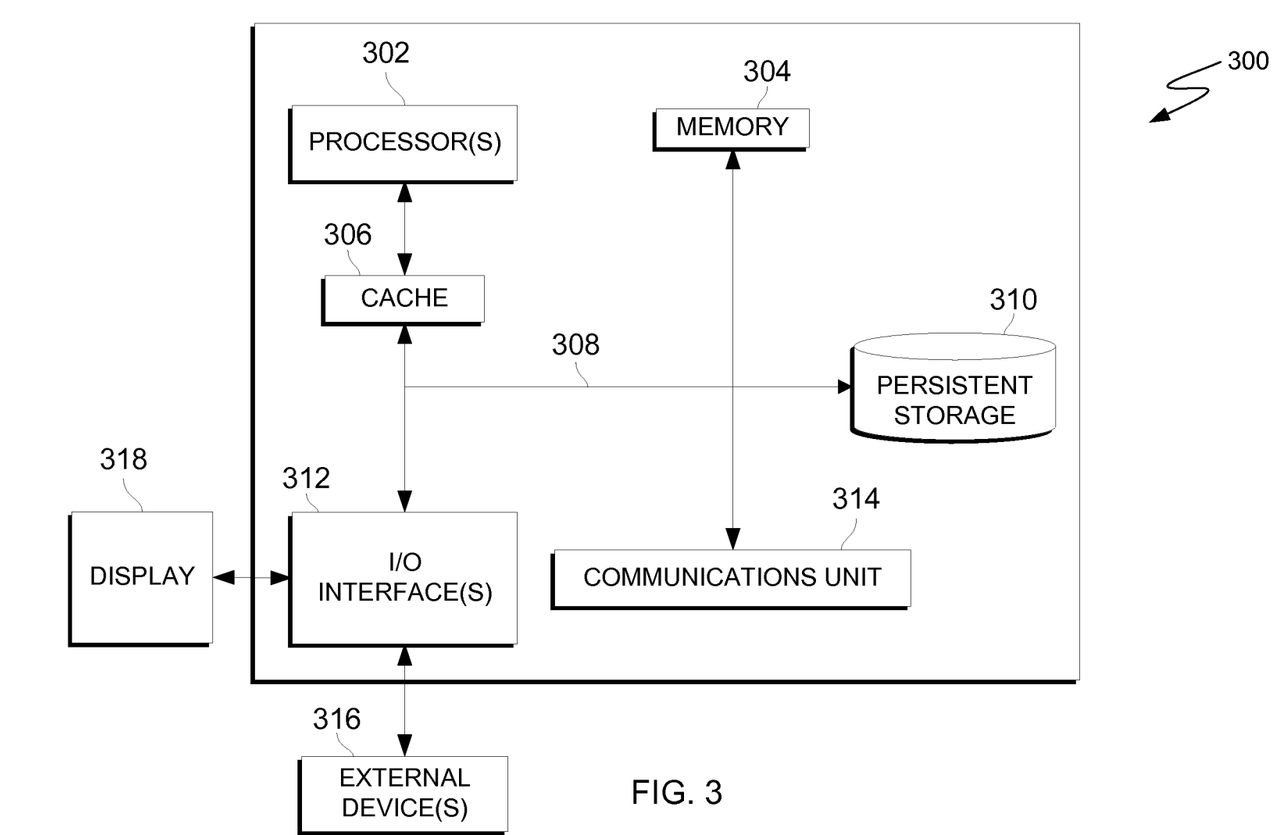
FIG. 3 is a block diagram of components of a computing device executing operations for multiple sub-string searching, in accordance with an embodiment of the present invention.

FIG. 3 is a block diagram of components of a computing device, generally designated 300, in accordance with an embodiment of the present invention. In one embodiment, computing device 300 is representative of computing device 102. For example, FIG. 3 is a block diagram of computing device 102 within computing environment 100 executing operations of sub-string searching program 104.

It should be appreciated that FIG. 3 provides only an illustration of one implementation and does not imply any limitations with regard to the environments in which different embodiments may be implemented. Many modifications to the depicted environment may be made.

Computing device 300 includes communications fabric 308, which provides communications between computer processor(s) 302, memory 304, cache 306, persistent storage 310, communications unit 314, and input/output (I/O) interface(s) 312. Communications fabric 308 can be implemented with any architecture designed for passing data and/or control information between processors (such as microprocessors, communications and network processors, etc.), system memory, peripheral devices, and any other hardware components within a system. For example, communications fabric 308 can be implemented with one or more buses.

Memory 304 and persistent storage 310 are computer-readable storage media. In this embodiment, memory 304 includes random access memory (RAM). In general, memory 304 can include any suitable volatile or non-volatile computer readable storage media. Cache 306 is a fast memory that enhances the performance of processors 302 by holding recently accessed data, and data near recently accessed data, from memory 304.

Program instructions and data used to practice embodiments of the present invention may be stored in persistent storage 310 and in memory 304 for execution by one or more of the respective processors 302 via cache 306. In an embodiment, persistent storage 310 includes a magnetic hard disk drive. Alternatively, or in addition to a magnetic hard disk drive, persistent storage 310 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 310 may also be removable. For example, a removable hard drive may be used for persistent storage 310. Other examples include optical and magnetic disks, thumb drives, and smart cards that are inserted into a drive for transfer onto another computer-readable storage medium that is also part of persistent storage 310.

Communications unit 314, in these examples, provides for communications with other data processing systems or devices, including resources of network 120. In these examples, communications unit 314 includes one or more network interface cards. Communications unit 314 may provide communications through the use of either or both physical and wireless communications links. Program instructions and data used to practice embodiments of the present invention may be downloaded to persistent storage 310 through communications unit 314.

I/O interface(s) 312 allows for input and output of data with other devices that may be connected to computing device 300. For example, I/O interface 312 may provide a connection to external devices 316 such as a keyboard, keypad, a touch screen, and/or some other suitable input device. External devices 316 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 310 via I/O interface(s) 312. I/O interface(s) 312 also connect to a display 318.

Display 318 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
  receiving, by one or more processors, a search query of an original text, wherein:
    the search query comprises a plurality of sub-strings including a first sub-string of a first length and a second sub-string of a second length; and
    the first length is different than the second length;
  determining, by one or more processors, a number of different sub-string lengths present within the plurality of sub-strings;
  allocating, by one or more processors, a hash array having a number of entries, wherein the number of entries is based on (i) the determined number of different sub-string lengths and (ii) a character length of the original text;
  populating, by one or more processors, the hash array with a plurality of hash values, wherein:
    the plurality of hash values are generated using: (i) a first rolling hash equal to the first length, and a second rolling hash equal to the second length; and
    each of the plurality of hash values corresponds to a portion of the original text;
  computing, by one or more processors, a plurality of sub-string values based, at least in part, on the plurality of sub-strings; and
  determining, by one or more processors, whether each of the plurality of sub-strings occurs in the original text based on searching the hash array for the plurality of sub-string values.

2. The method of claim 1, further comprising:
  determining, by one or more processors, that a first hash value of the hash array matches a first sub-string value of the plurality of sub-string values and, in response, determining, by one or more processors, whether a first portion of the original text corresponding to the first hash value is equal to a first sub-string corresponding to the first sub-string value.

3. The method of claim 2, further comprising:
  determining, by one or more processors, that the first portion of the original text is equal to the first sub-string based, at least in part, on a character-by-character comparison of the first portion of the original text and the first sub-string.

4. The method of claim 1, wherein searching the hash array for plurality of sub-string values comprises:
  initializing, by one or more processors, a TRT array, wherein the TRT array comprises a plurality of action codes;
  flagging, by one or more processors, one or more action codes based on the plurality of sub-string values; and
  comparing, by one or more processors, the TRT array and the hash array.

5. The method of claim 1, wherein populating the hash array comprises:
  calculating, by one or more processors, a first hash sequence based, at least in part, on portions of the original text having lengths equal to the first length;
  calculating, by one or more processors, a second hash sequence based, at least in part, on portions of the original text having lengths equal to the second length; and
  compiling, by one or more processors, the hash array by interleaving the hash values of the first hash sequence and the second hash sequence.

6. The method of claim 1, wherein searching the hash array for plurality of sub-string values comprises:
  initializing, by one or more processors, a vector, wherein the vector comprises the plurality of sub-string values; and comparing, by one or more processors, the vector and the hash array.

7. The method of claim 1, wherein the plurality of sub-strings further comprises a third sub-string of the first length.

* * * * *